Nov. 24, 1936.  H. L. WILLIAMS  2,062,243
AUTO BOXCAR
Filed Dec. 24, 1931  5 Sheets-Sheet 2
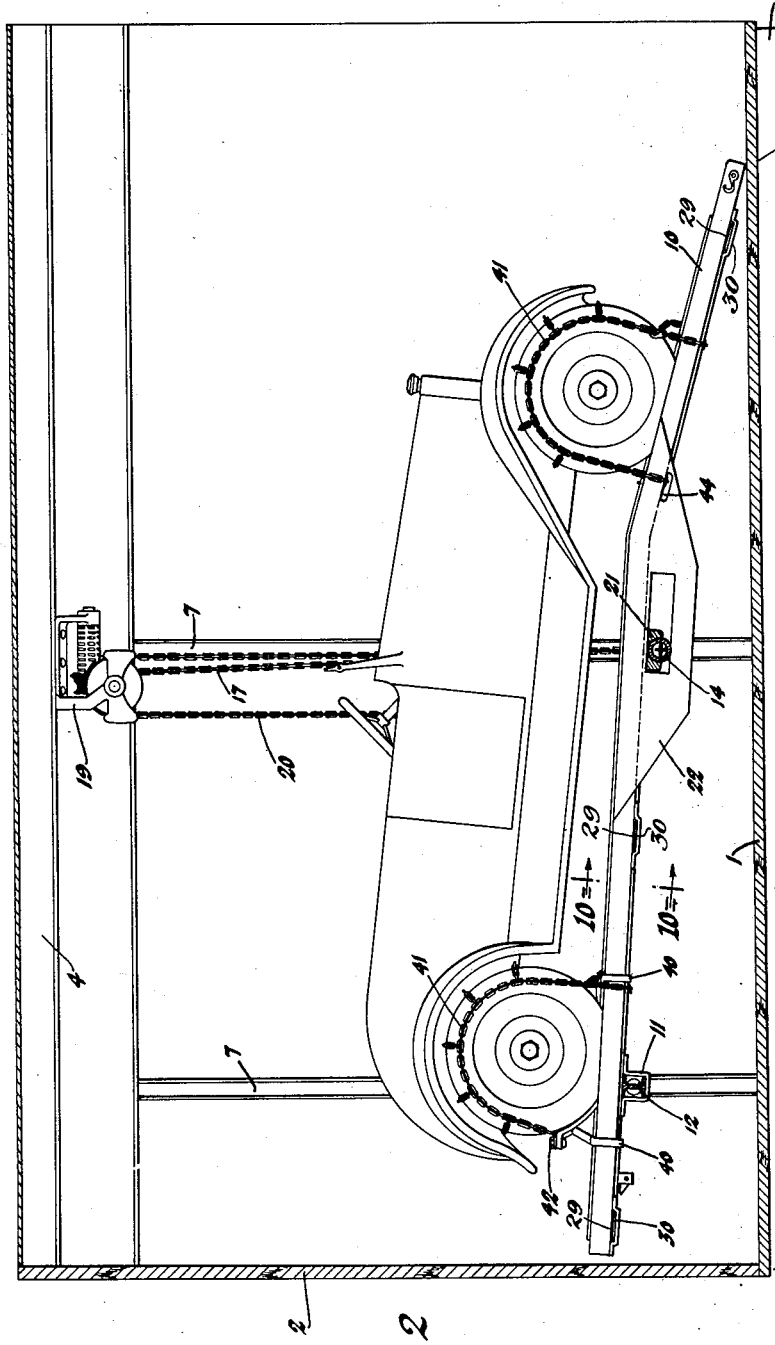
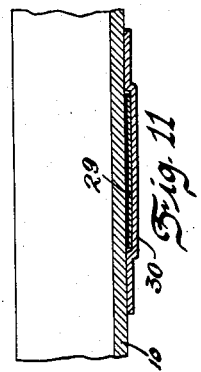
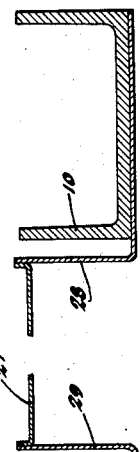
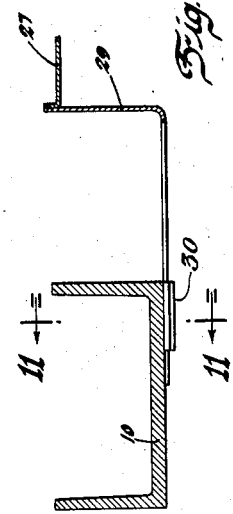
Inventor
Hubert L. Williams
By Blackmore, Spencer & Flint
Attorneys

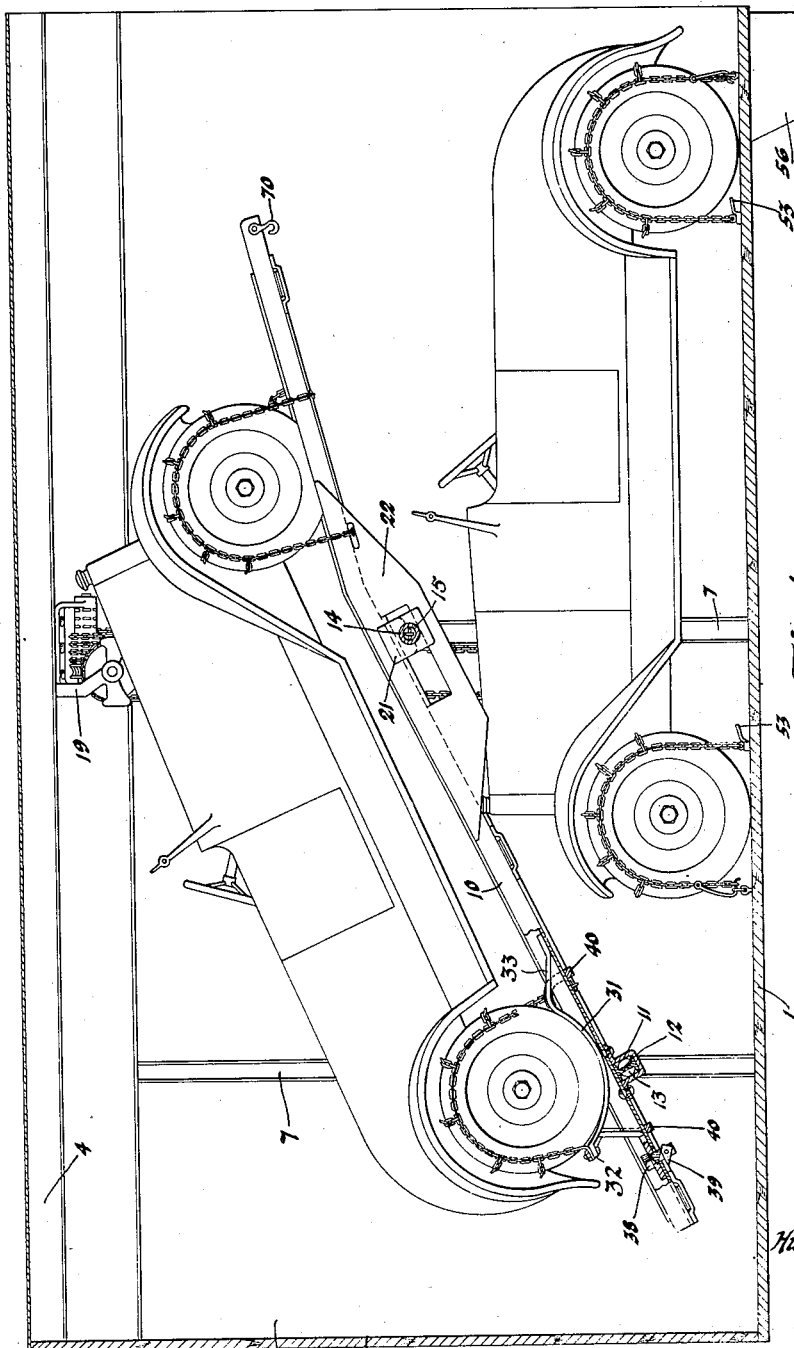

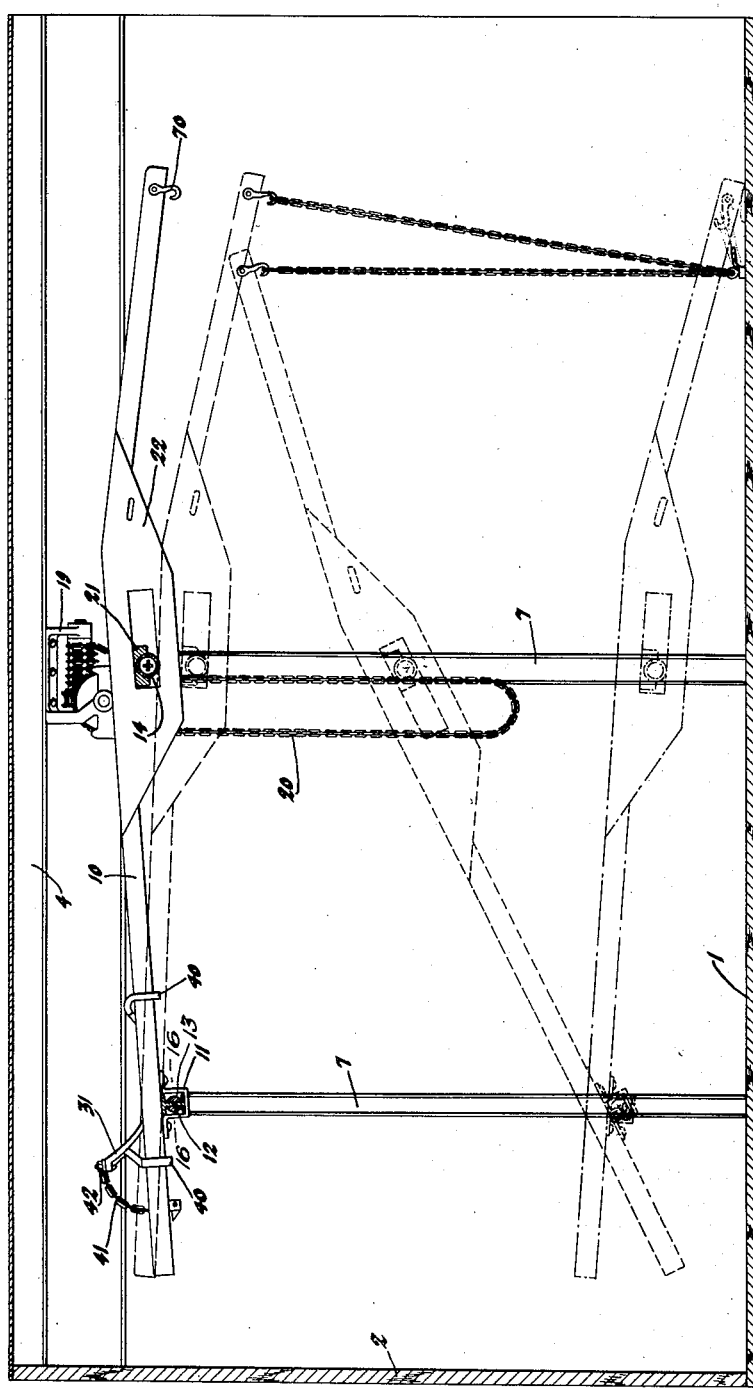

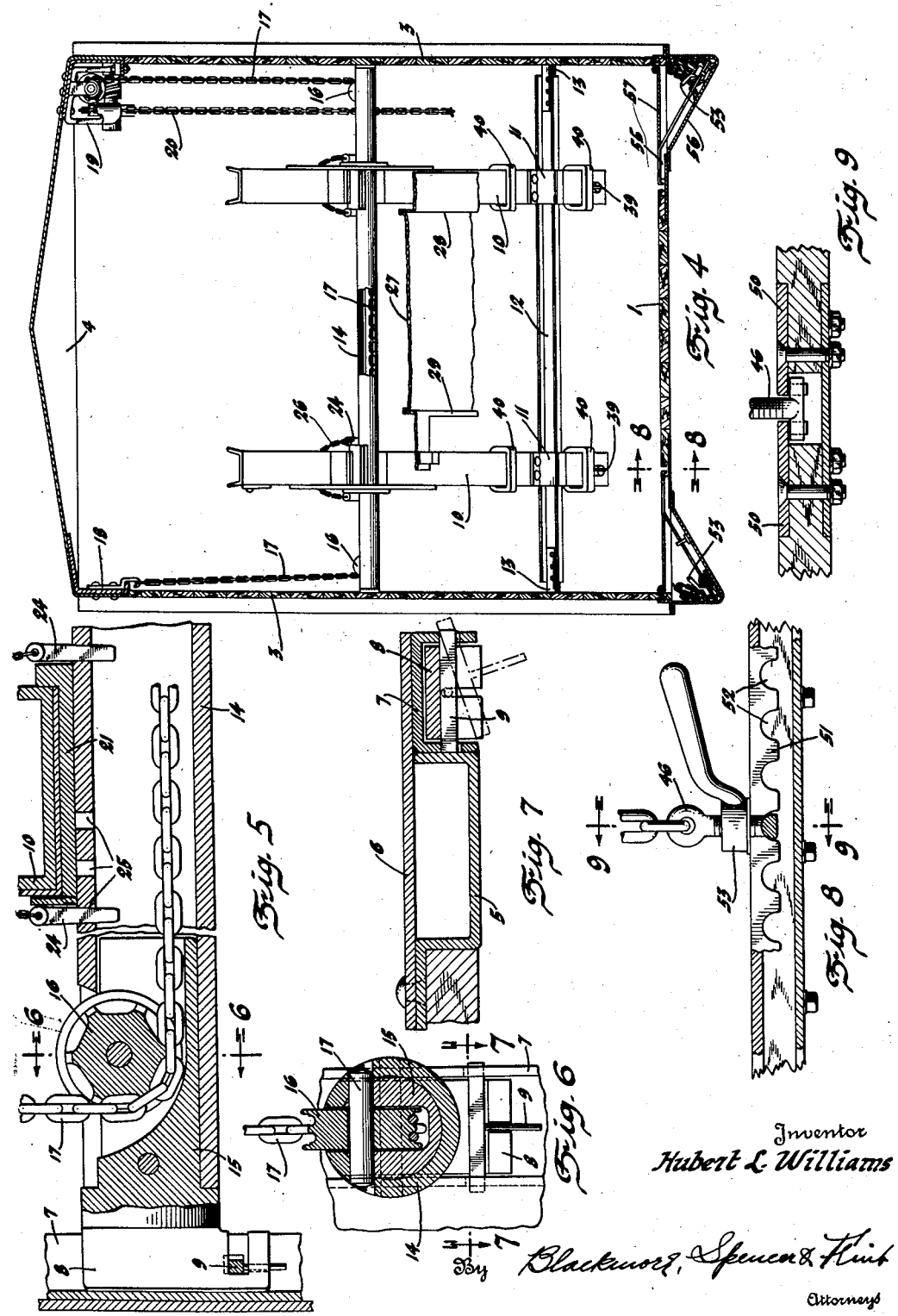

Nov. 24, 1936.  H. L. WILLIAMS  2,062,243
AUTO BOXCAR
Filed Dec. 24, 1931  5 Sheets-Sheet 5

Inventor
Hubert L. Williams

By Blackmore, Spencer & Hurt
Attorneys

Patented Nov. 24, 1936

2,062,243

UNITED STATES PATENT OFFICE 2,062,243

AUTO BOXCAR

Hubert L. Williams, Detroit, Mich., assignor, by mesne assignments, to The New York Central Railroad Company, Detroit, Mich., a corporation of Michigan Application December 24, 1931, Serial No. 583,091

16 Claims. (Cl. 105—368)

This invention relates to carrier conveyances for the transportation of freight, and particularly to an improved railroad boxcar that is especially adapted for the shipment of motor vehicles and the like.

The universal custom followed by motor car manufacturers in the shipment of their product is to load three or four automobiles in a conventional boxcar and to use various types of holddown or anchor mechanisms, as well as supporting horses or decks. The shipping equipment is usually nailed and spiked, or otherwise fastened to the freight car floor and walls by the shipper and torn loose by the consignee and thrown away. Such methods and apparatus have been costly not only to the shipper and consignee, but also to the railroads, inasmuch as the freight car necessarily suffers damage and requires frequent repair and replacement of floor and siding.

It is here proposed to abandon shipping practice previously followed together with its objectionable features by the provision of an auto boxcar embodying as a permanent part thereof, equipment especially designed for loading automobiles but so incorporated as not to preclude the use of the freight car for the shipment of other merchandise. To this end, there is contemplated among other things, the provision of a railroad boxcar or other conveyance having one or more vertically movable supporting platforms or frames for receiving an automobile or the like, adjustably asociated with and supported by the car walls and arranged for movement to several positions, including a loading position adjacent the car floor, a loaded or shipping position intermediate the top and bottom of the car to afford clearance therebeneath for a second automobile or other freight on the car floor, and a storage position near the roof when the car is to be used for purposes other than the transportation of motor vehicles. Various items of novelty contained in a preferred but not necessarily only embodiment as illustrated in the accompanying drawings will become apparent during the course of the following detailed specification.

In the drawings:

Figure 1 is a longitudinal sectional view of one-half of the freight car showing two automobiles loaded therein in accordance with the present invention.

Figure 2 is a similar view of the freight car with the shipping deck in its lowered or loading position and with an automobile mounted thereon.

Figure 3 is a longitudinal sectional view and illustrates the frame in various positions of manipulation.

Figure 4 is a transverse section of a freight car with the deck in an upwardly inclined shipping position.

Figure 5 is a detail sectional view of a portion of the supporting frame secured to the side wall.

Figure 6 is a section on line 6—6 of Figure 5.

Figure 7 is a section of the car wall taken on the line 7—7 of Figure 6.

Figure 8 is a longitudinal section of a fragment of the car floor.

Figure 9 is a transverse section of the car floor and is taken on line 9—9 of Figure 8.

Figure 10 is a transverse section of the vehicle supporting deck taken on line 10—10 of Figure 2.

Figure 11 is a detail section on line 11—11 of Figure 10.

Figure 12 is a detail perspective view of a wheel engaging chock.

Figure 13:
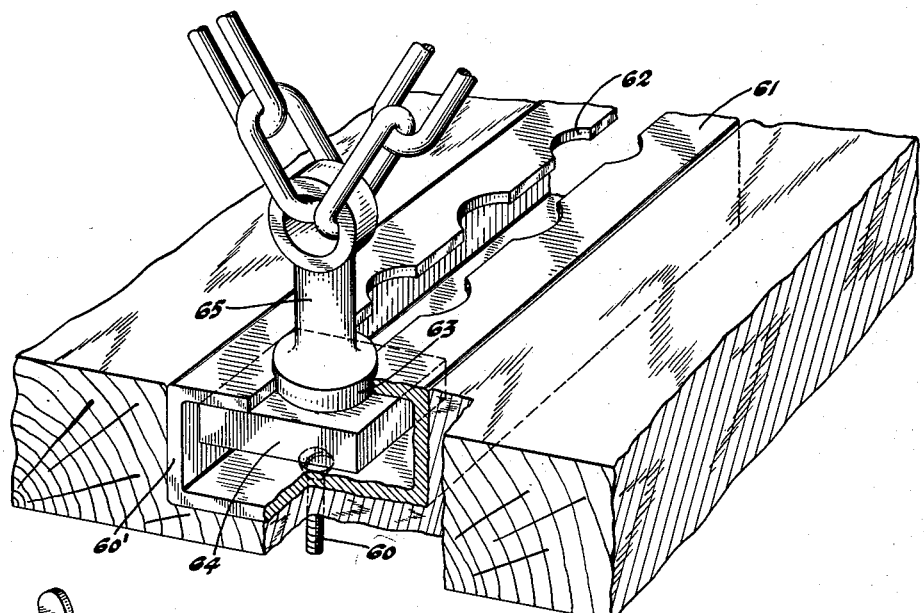
Figure 13 is a detail perspective view of an alternative form of floor slot and hold-down anchor.

Referring to the drawings, the freight car shown involves a floor 1, an end wall 2, a pair of side walls 3—3 and a roof 4. The side walls of the car include a series of spaced vertical posts, each of which may consist of a channel member 5 and an outer plate 6 secured thereto (see Figure 7). To certain selected posts or to the side wall proper, there may be secured, as by welding, channeled guides 7, four of such guides being provided at each end of the car and arranged in transversely alined pairs spaced longitudinally of each other. In each guide member 7 is located a sliding block 8 which can be secured in certain selected positions. For holding the block against sliding movement, it may be provided with a transverse groove or notch to receive the head of a T-shaped member 9, whose stem extends downwardly and is received within a vertical groove in the block, with the opposite ends of the head extending beyond the block and into alined openings in the side walls or flanges of the guide 7. To change the position of the block, the stem part of the T-member 9 must be swung out of its groove to permit the head to be shifted laterally first in one direction to remove one end from the receiving opening in the guide and then tilted clear of the guide to substantially the dotted line position in Figure 7, and shifted in the other direction to move the other end out of the corresponding opening on the other side of the guide 7. The block is then free for sliding movement to a new position, and the procedure is reversed to lock it in place. To prevent accidental loss of the locking T-member, the end of its stem may be fastened by a flexible cable or link to the sliding block.

Each sliding block receives and supports an end of a supporting bar that extends transversely from car wall to car wall and forms a part of the shipping deck, which deck includes also a pair of longitudinally extending and transversely spaced tracks or supporting frame members 10—10, to receive the front and rear wheels of a vehicle to be shipped. These wheel receiving tracks are shown of channeled cross section, but it is to be understood that their particular shape is of no essential consequence. Adjacent one end, the longitudinal members 10 are provided, each with a U-shaped keeper 11 which straddles and secures to the track the transverse member 12, which may be in the nature of an I-beam having at opposite ends a circular extension or trunnion 13 that has a bearing and extends into an opening in an associated sliding block 8. The pivotal connection thus afforded, enables the deck to be swung about the transverse axis of the member 12 in the manner and for the purpose to be pointed out hereinafter.

The other transverse member 14 is shown in the drawings as consisting of a hollow tube receiving at opposite ends a reinforcement member 15 secured to and forming a part of the adjacent sliding block 8. A slot or opening is formed in the upper portion of the extension 15 to receive a pulley wheel 16 pivoted on an axle 17 extending through both the reinforcement 15 and the wall of the tube 14. The pulley wheel projects through an opening formed in the upper side of the tube 14 into which extends a lifting chain or cable 17. As shown, particularly in Figure 4, this chain or lifting cable may extend downwardly at one side from an anchorage or attachment bracket 18 in the upper portion of the car, and after passing over the pulley and through the hollow tube and over the pulley on the opposite end of the tube is extended upwardly for connection to suitable hoisting mechanism 19 mounted in the upper portion of the car on the side opposite to the anchored or fixed end of the cable. The hoisting mechanism 19 may be of any convenient and conventional construction. The type of mechanism here shown is operated by an endless chain 20 passing over a pulley fixed on a shaft carrying a worm gear by which a winding drum is rotated.

Since the vertically movable member 14 is non-rotatable, provision is made for relative movement between the member 14 and the longitudinal tracks 10 when the frame or deck is swung to its various positions of adjustment. For this purpose there may be employed a bearing shoe 21 having an arcuate seat on one side for the tube and a flat surface on its opposite side for sliding movement on the bottom of the track. Relative sliding movement is accommodated by an elongated opening formed in a vertical gusset plate 22 secured to the track member intermediate its length to strengthen the same and through which opening the cross member 14 slidably extends, the gusset plate thereby forming a keeper or connection between these two parts.

In order to accommodate vehicles of various sized treads, the connections between the longitudinal and transverse members are such as to permit a relative transverse adjustment of the tracks 10. To hold the tracks in adjusted positions, use is made of locating pins 24 (see Figure 5) for contact with the sides of the tracks 10 when engaged in selected openings or seats 25, provided in the cross member 14 in certain predetermined spacing. In order that the locating pins may not be lost they can be secured to the tracks by flexible connections 26.

It will be found desirable to use a protector or drip sheet to prevent grease and oil dropping from the raised automobile on the vehicle loaded on the floor beneath. Such drip sheet may consist as shown in Figures 10 and 11 of a metal plate 27 extending between the track members and secured thereto by angle brackets 28 and 29. The brackets 28 on one side of the drip sheet may be welded or otherwise permanently secured to one of the track members 10 in given spaced relation, while the brackets 29 may extend into and be slidably received by keepers 30 fastened on the underside of the other wheel receiving member 10.

To locate the vehicle on the track, it is proposed to employ a wheel chock, such as shown in Figure 12, which may consist of a wheel receiving arcuate strip 31 of sheet metal having at one end an outwardly extending apertured ear 32, and at its opposite end an inclined ramp 33 terminating in a forwardly extending rest or foot 34. A bracket 35 having an outturned flange 36 secured to the arcuate seat 31 just below the apertured ear 32 is provided with a rearwardly extending foot or rest 37, which is apertured to receive a locating stud or bolt 38 adapted to extend in one of a number of longitudinally spaced openings in the wheel receiving track 10. The bolt 38 carries a pivoted latch 39 to engage the underside of the track to hold it in place. There is thus provided an attachment which permits the chock to be adjusted longitudinally of the track to take care of vehicles of different wheel bases. This chock is preferably provided at front and rear with a pair of U-shaped keepers 40, the ends being welded or otherwise secured to the chock to provide open loops or keepers that slidably receive the tracks to prevent jumping or upward movement of the chock relative to the track.

The apertured ear 32 is intended for the attachment of suitable wheel hold-down mechanism. The hold-down here shown is in the nature of the well known anti-skid chain consisting of a series of cross links fastened to a pair of side chains running lengthwise of the chain assembly. The hold-down chain indicated by the numeral 41, differs from the ordinary anti-skid chain in that the terminal links at one end are joined together so that the two side portions are in effect a continuous chain. At the opposite end of the chain assembly, one of the side chains is longer than the other so that the longer side may be passed under the track or engaged with a suitable attachment device and have one of its end links detachably connected to an end link of the shorter side. As shown in the drawings, the closed or connected end of the chain assembly 41 is fastened to the apertured ear 32 by a suitable anchor bolt 42, the chain passing over the vehicle wheel with the longer side portion extending on the inside of the tire, then under the track 10 and connected to the short side by the lever connection 43. The hold-down 41 for the wheel at the opposite end of the car has its closed end permanently secured to the track by being passed through an opening 44 in the gusset plate 21 and its free ends are connected in the same fashion as that heretofore described.

Figure 14:
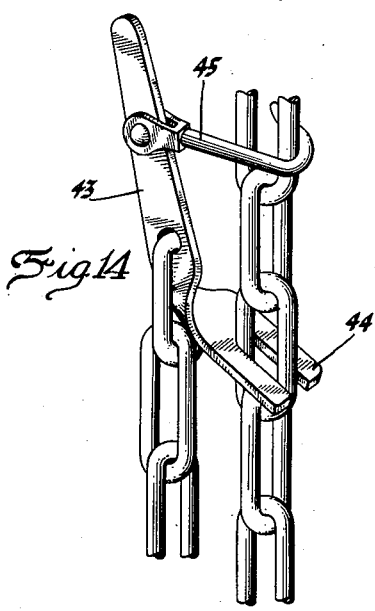
Figure 14 is an enlarged detail view showing a lever connection forming a part of the wheel hold-down.
Figure 15:
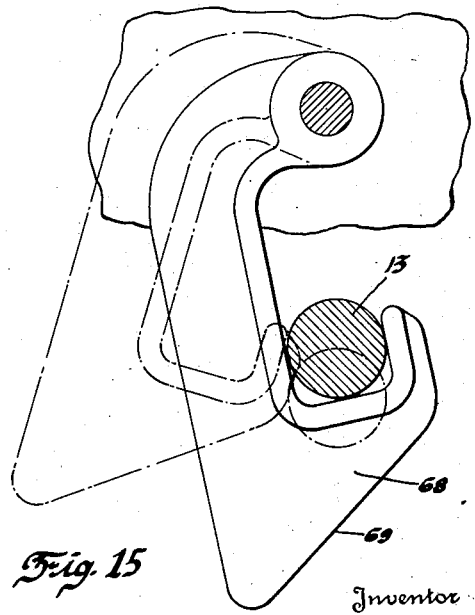
Figure 15 shows in detail the device for supporting the deck in its elevated position.
Figure 16:
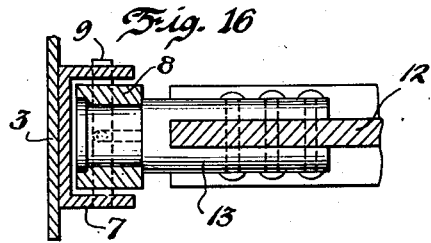
Figure 16 is an enlarged detail section taken on line 16—16 of Figure 3.

The detachable connection between the chain ends is illustrated in the detail view, Figure 14, where the lever member 43 formed from strip stock has an intermediate twist with one end forked as at 44 and the opposite end providing a pivot mounting for the hook or latch 45. The last link of the longer side chain is pivoted to the lever at an intermediate point about which the lever may be swung. To make a connection, one of the links of the short chain end is inserted between the forks after which the lever is swung to the position shown in Figure 14 and the member 45 hooked to a part of the chain adjacent thereto to prevent accidental uncoupling. It will be understood that the forked end is engageable with anyone of the endmost links, depending upon tire size, to draw the chain tight.

A chain hold-down of the same type may be employed to anchor a vehicle to the car floor. For chain anchorage purposes it is proposed to provide in the floor a pair of longitudinally extending T-slots in which are slidably positioned a series of headed anchor bolts 46. Two of such bolts are provided for each chain, one having an eye to receive the closed end of the chain, and the other an eye for insertion therethrough of the longer side chain. Since there is usually not a great deal of variation in the tread or transverse distance between wheels of different makes of automobiles, the two slots may be located at a given distance apart to take care of the average size tread. The wheels on vehicles of other treads will lie on one side or the other of the slot, but inasmuch as the offset will be small, chain flexibility will compensate for the slight misalinement.

The floor T-slot may be made by simply providing a longitudinal groove in the wooden flooring, to which may be secured a pair of spaced plates 50, each having a portion overlapping the slot to retain the head of the bolt 46 in place. One or both of the plates 50 may be provided with a dependent flange 51 having therein a series of spaced notches or seats 52 to receive the head of the anchor bolt and locate it against displacement. If desired, the shank of the bolt may be threaded to receive a nut 53 by means of which a positive connection is afforded. Thus, each anchorage bolt is adjustable longitudinally of the slot to take care of any given wheel base.

For storage purposes each slot may have a laterally extended branch 55 that projects downwardly into a storage box or receptacle 56 built into the car floor and provided with a suitable cover or lid 57. The provision of the storage box enables several anchor bolts and hold-down chains to be disposed of and at the same time prevent theft or loss.

A modified form of the T-slot is shown in Figure 13 wherein there is provided a longitudinally extending C-shaped member $60^1$ having its ends turned inwardly and entending in spaced relation to each other to provide a slot. At regular intervals the adjacent edges of the inturned portions 61 are provided with alined notches 62 which provide seats or keepers for the enlarged boss 63 on the head 64 of the anchorage bolt 65. This member $60^1$ is received within a longitudinal groove in the wooden flooring and is secured thereto by a series of studs or screws 60 passing through the base of the slotted member. To receive the fastening studs 60, the base portion is preferably pierced at regular intervals in alinement with the grooves 62 and the portions adjacent each opening are turned downwardly to provide a dependent edge that tends to bite into the wood and a counterbore to receive the tapered head of the screw. The grooves 62 facilitate the insertion and connection of the attachment screws.

To take the load off the sliding blocks and eliminate the need for a manual manipulation of the locating pins 9 when the deck is elevated to storage position near the roof, an arrangement may be provided to automatically engage the deck and support it overhead. For this purpose, it is proposed to employ a swinging hook or latch 68 at each end of the two transverse members 12 and 14, which hooks are pivotally supported near the roof of the car to hang directly in the path of movement of the transverse members. Each hook is provided with a cam face 69 for engagement with an associated cross member 25 to swing the hook out of the path of upward movement until the cross member moves therebeyond and permits its return to receive the deck cross member. Instead of direct engagement with the transverse member, it will be understood that provision can be made for the hooks to engage with other parts of the frame or with special devices carried thereby.

Only one man is needed to manipulate the loading equipment to either load or unload vehicles. If a vehicle is to be loaded and the frame is in the storage position, the workman first operates the hoist mechanism to lower the forward end of the deck to substantially the broken line position illustrated in Figure 3. One of the hold-down chains anchored to the floor is then engaged with a front end portion ofthe deck by means of the attachment hook 70 or the like, and this hold-down chain then acts as a fulcrum about which the frame can be swung to approximately the dotted line position in Figure 3 where the connection is made between the sliding blocks and guides associated with the cross member 12. Upon a further operation of the hoist the frame can be dropped or swung to the dot and dash position of Figure 3 which is the lowered or loading position. After a vehicle has been pushed, driven or otherwise located upon the wheel receiving tracks and fastened by anchor chains or otherwise, a further manipulation of the hoisting mechanism will serve to swing the forward end of the frame about the fixed pivotal axis of the bar 12 until the frame is moved toward an upwardly inclined shipping position as shown in Figure 1, where the sliding blocks associated with the transverse member 14 will be locked to their respective guides. The space beneath the raised deck provides ample clearance for a second vehicle to be loaded and anchored in place by the chain hold-downs. The operation referred to are simply reversed when the car is to be unloaded.

It may be mentioned that when the various parts are in storage position the hoist operating cable 20 may be moved out of the way and inserted within an adjacent channel guide 7 and held in place by transverse pins extending through openings in the sides of the guide.

In the usual link chain structure each link has its ends welded together to provide strength. It is here proposed to omit the welded joint in at least one link of the assembly and preferably in a transverse or cross chain. This one weak link affords a safety factor against breakage of both vehicle and car parts in that a severe jolt or force which would work damage if the vehicle were rigidly held in place, will strain the link and spread the ends apart to allow the slight movement needed to cushion the shock, without entirely destroying the hold-down connection.

I claim:

1. In an auto boxcar, a pair of transversely spaced longitudinally extending wheel receiving tracks, a pair of longitudinally spaced transversely extending supports for the tracks, one of said supports providing a pivotal support for the frame about which the frame may be swung from a lowered loading position to an upwardly inclined shipping position, means adjustably connecting opposite ends of the supports to the car walls, means for varying the adjustment of one support independently of the other, and hoisting means connected to and extending in part through one of the supports.

2. In an auto boxcar, means to load one automobile in the upper portion of the car to afford space therebeneath for a second automobile, including a supporting frame for the first automobile, which comprises a pair of longitudinally extending tracks to receive the front and rear wheels of the automobile, a pair of transversely extending supports for the tracks, means adjustably connecting a support to the car side walls for the vertical movement of said support to swing the tracks in a vertical plane about the other support as a transverse axis, a sliding connection between the swinging tracks and the said vertically movable support, and hoisting means connected to and extending in part through one of the supports.

3. Equipment for loading vehicles for shipment, comprising longitudinally extending wheel receiving means, a pair of vertically movable transverse members spaced apart longitudinally of the wheel receiving means, and each connected to the said wheel receiving means, being such as to allow and accommodate longitudinal movement of the wheel receiving means relative to the associated transverse member, and means connected to and extending through one of the transverse members for raising and lowering the wheel receiving means.

4. Equipment for loading vehicles one above another for shipment, including a vehicle receiving frame embodying track members, longitudinally spaced supports for the frame, one of which is a pivotal support and another a vertically movable support for swinging the frame bodily about the axis of the pivotal support between lowered loading and elevated inclined shipping positions, the track members having portions extending forwardly and rearwardly from the point of location of the vertically movable support and arranged at an angle to each other, and a keeper connecting said angularly related portions of the track members of the frame and reinforcing the same and also connecting the frame and movable support and accommodating relative longitudinal movement therebetween upon swinging movement of the frame.

5. The structure of claim 4 wherein the keeper comprises a gusset plate provided with an elongated opening movably receiving the support.

6. Equipment for loading vehicles one above another for shipment, including a vehicle receiving frame, longitudinally spaced supports for the frame, one of which is a pivotal support and another a vertically movable support for swinging the frame bodily about the axis of the pivotal support between lowered loading and elevated inclined shipping positions, a bearing shoe rotatably engaging the vertically movable support and slidably engaging the frame, and hoisting means connected to and extending in part through said vertically movable support.

7. Equipment for locating vehicles one above another for shipment, including a vehicle receiving frame, means to support the frame for swinging movement between a lowered loading position and an elevated inclined loaded position, a transversely extending hollow member engaging the frame in longitudinal spaced relation to said supporting means, a cable passing through the hollow member with opposite ends extending upwardly therefrom and hoisting mechanism associated with an end of the cable.

8. In an auto freight car, a vertically adjustable automobile supporting frame including a pair of longitudinally extending wheel receiving track members, and a pair of vertically movable supports extending transversely from car wall to car wall, one of which forms a pivotal axis on which the frame is mounted to tilt and on which supports said track members are transversely adjustable to receive the wheels of different width automobiles, and wheel chocks on the track receiving members adjustable longitudinally thereof.

9. In a freight carrier for the transportation of vehicles, a vehicle supporting deck comprising a pair of transversely spaced wheel receiving members, and a drip sheet positioned in the space between the members and fixed to one member and slidably engaging the other member.

10. In a freight carrier for the transportation of vehicles, a vehicle supporting deck comprising a pair of transversely spaced and adjustable wheel receiving members, a drip sheet positioned between the members, and supporting means for the drip sheet fixed to one of the wheel receiving members and slidably engaging the other wheel engaging member for accommodating relative adjustment of the wheel receiving members.

11. In an auto freight car, a vertically adjustable automobile supporting frame including a pair of longitudinally extending wheel receiving track members, and a pair of supports extending transversely from car wall to car wall and on which said track members are transversely adjustable to receive the wheels of different width automobiles, and a drip sheet carried by said track members and fixed to one track member and secured to the other track member by an adjustable connection.

12. Vehicle shipping equipment including a vehicle supporting frame, a vertically movable pivotal support for the frame about which the frame may be swung from a lowered loading position to an upwardly inclined shipping position, a transversely extending support, a connection between said support and the frame accommodating relative movement upon swinging movement of the frame, a single hoisting means for raising and lowering the frame on both supports or on the second support to pivot the frame on the first support, the said pivotal support being arranged adjacent one end of the frame and the second-named support between the transverse center and opposite end of the frame, and steadying means connected with the latter named end of the frame for applying a steadying force thereto when it is desired to raise or lower both supports simultaneously.

13. Equipment for loading vehicles one above another for shipment, including a vehicle receiving frame, a pair of longitudinally spaced supports for the frame, one of which is a vertically movable pivotal support located adjacent one end of the frame and the other a vertically movable support located between the transverse center of the frame and opposite end of the frame for swinging the frame bodily about the axis of the pivotal support between lowered loading and elevated shipping positions, said frame and movable support being movable relatively to each other in a direction longitudinally of the frame, a hoisting unit for both vertically raising and swinging the frame connected solely to the vertically movable support, and steadying means for applying a steadying force to the latter named end of the frame when it is desired to raise or lower both supports simultaneously.

14. In an auto freight car, vehicle shipping equipment within the car including a vehicle supporting frame, a vertically movable pivotal support for the frame located adjacent one end of said frame about which the frame may be swung from a lowered loading position to an upwardly inclined shipping position, a transversely extending support located between the transverse center and opposite end of the frame, a connection between said support and the frame accommodating relative movement upon swinging movement of the frame, a hoisting means for raising and lowering the frame on both supports or on the second support to pivot the frame on the first support, and a connection between the second-named end of the frame and the car structure for steadying such end of the frame when it is desired to raise or lower the frame on both supports.

15. In an auto freight car, vehicle shipping equipment within the car including a vehicle supporting frame, a pivotal support between the car and frame located adjacent one end of said frame about which the frame may be swung from a lowered loading position to an upwardly inclined shipping position, a second pivotal support between the car and frame located at a point between the transverse center and opposite end of the frame, said second pivotal support having a sliding connection with the frame permitting longitudinal movement of the frame relative thereto upon swinging movement of the frame on the first-named pivotal support, hoisting means for raising and lowering the frame, and means for connecting the latter-named end of the frame to the vehicle for applying a steadying force to the frame in its raising and lowering movements.

16. Equipment for loading vehicles for shipment, comprising longitudinally extending wheel receiving means, a pair of vertically movable transverse members spaced apart longitudinally of the wheel receiving means and each connected to said wheel receiving means, the connection of one of the transverse members with the wheel receiving means being such as to allow and accommodate longitudinal movement of the wheel receiving means relative to said transverse member, the other transverse member forming a pivotal axis located between the center and one end of the frame on which said frame is mounted to tilt vertically, means for raising and lowering the wheel receiving means with the first-named transverse member, and means for connecting said end of the frame with the vehicle for applying a steadying force to the frame in its raising and lowering movements.

HUBERT L. WILLIAMS.